US012046811B2

(12) United States Patent
Shen et al.

(10) Patent No.: US 12,046,811 B2
(45) Date of Patent: Jul. 23, 2024

(54) ANTENNA CONNECTING-SWITCHING APPARATUS

(71) Applicant: GRAND-TEK TECHNOLOGY CO., LTD., New Taipei (TW)

(72) Inventors: Kung-Yu Shen, New Taipei (TW); Chien-Wen Hung, New Taipei (TW)

(73) Assignee: GRAND-TEK TECHNOLOGY CO., LTD., New Taipei (TW)

( * ) Notice: Subject to any disclaimer, the term of this patent is extended or adjusted under 35 U.S.C. 154(b) by 135 days.

(21) Appl. No.: 17/968,538

(22) Filed: Oct. 18, 2022

(65) Prior Publication Data

US 2024/0021981 A1 Jan. 18, 2024

(30) Foreign Application Priority Data

Jul. 12, 2022 (TW) ................................ 111207453

(51) Int. Cl.

*H01Q 1/50* (2006.01)
*H01Q 1/24* (2006.01)
*H01Q 21/30* (2006.01)

(52) U.S. Cl.
CPC ................ *H01Q 1/50* (2013.01); *H01Q 1/24* (2013.01); *H01Q 21/30* (2013.01)

(58) Field of Classification Search
CPC ............. H01Q 1/50; H01Q 1/24; H01Q 21/30
See application file for complete search history.

*Primary Examiner* — Graham P Smith
(74) *Attorney, Agent, or Firm* — Chun-Ming Shih; HDLS IPR SERVICES

(57) ABSTRACT

An antenna connecting-switching apparatus includes a housing, a first connection structure, a second connection structure, an elastic body, an elastic piece structure and an electronic switch. The elastic piece structure includes a first elastic piece and a second elastic piece. When an external antenna is connected to the first connection structure, the first connection structure compresses the elastic body pushing the first elastic piece; the first elastic piece contacts the second elastic piece; the electronic switch is switched; a wireless communication circuit is electrically connected to the external antenna. When the external antenna stops connected to the first connection structure, the elastic body rebounds pushing the first connection structure; the first connection structure stops pushing the first elastic piece; the first elastic piece stops contacting the second elastic piece; the electronic switch is switched; the wireless communication circuit is electrically connected to an internal antenna.

10 Claims, 8 Drawing Sheets

ANTENNA CONNECTING-SWITCHING APPARATUS

BACKGROUND OF THE DISCLOSURE

Technical Field

The present disclosure relates to a connecting-switching apparatus, and especially relates to an antenna connecting-switching apparatus.

Description of Related Art

Most wireless communication products have built-in antennas to transmit and receive wireless signals. The built-in antennas are limited by the limited installation space and circuit interferences, which easily lead to poor results in transmitting and receiving wireless signals. Therefore, some wireless communication products reserve the connecting ports for the external antennas which are used to improve the above problems.

When the external antenna is not connected to the wireless communication product, the built-in antenna is connected to the wireless communication circuit in the wireless communication product, but when the external antenna is connected to the wireless communication product through the reserved connecting port mentioned above, the wireless communication product has a mechanism to cut off the signal connection between the built-in antenna and the wireless communication circuit, and this mechanism can establish the signal connection between the external antenna and the wireless communication circuit at the same time. The apparatus that achieves this mechanism may be called an antenna connecting-switching apparatus.

However, the structure of the current antenna connecting-switching apparatus is extremely complex, which increases the difficulty of manufacturing the antenna connecting-switching apparatus.

SUMMARY OF THE DISCLOSURE

In order to solve the above-mentioned problems, an object of the present disclosure is to provide an antenna connecting-switching apparatus.

In order to achieve the object of the present disclosure mentioned above, the antenna connecting-switching apparatus of the present disclosure is applied to an external antenna, an internal antenna and a wireless communication circuit. The antenna connecting-switching apparatus includes a housing, a first connection structure, a second connection structure, an elastic body, an elastic piece structure and an electronic switch. The first connection structure is arranged in the housing. The second connection structure is arranged in the housing and connected to the first connection structure. The elastic body is arranged in the housing and arranged between the first connection structure and the second connection structure. The elastic body and the housing are electrically insulated. The elastic piece structure is connected to the housing and includes a first elastic piece and a second elastic piece. The second elastic piece has a voltage signal. The electronic switch is electrically connected to the first elastic piece, the second connection structure, the wireless communication circuit and the internal antenna. Moreover, when the external antenna is connected to the first connection structure, the first connection structure is configured to compress the elastic body and push the first elastic piece, the first elastic piece is configured to contact the second elastic piece, and the electronic switch is configured to be switched so that the wireless communication circuit is electrically connected to the external antenna. Moreover, when the external antenna stops being connected to the first connection structure, the first connection structure is configured to stop compressing the elastic body, so that the elastic body is configured to rebound to push the first connection structure, so that the first connection structure is configured to stop pushing the first elastic piece, the first elastic piece is configured to stop contacting the second elastic piece, and the electronic switch is configured to be switched so that the wireless communication circuit is electrically connected to the internal antenna.

Moreover, in an embodiment of the antenna connecting-switching apparatus of the present disclosure mentioned above, the elastic body is a spring.

Moreover, in an embodiment of the antenna connecting-switching apparatus of the present disclosure mentioned above, the antenna connecting-switching apparatus further includes a voltage supply electrically connected to the second elastic piece. Moreover, the voltage supply is configured to generate and supply the voltage signal to the second elastic piece. The voltage signal is a voltage greater than zero.

Moreover, in an embodiment of the antenna connecting-switching apparatus of the present disclosure mentioned above, the first connection structure includes a center conductor arranged in the housing and connected to the second connection structure.

Moreover, in an embodiment of the antenna connecting-switching apparatus of the present disclosure mentioned above, the first connection structure further includes a pusher arranged in the housing and connected to the center conductor.

Moreover, in an embodiment of the antenna connecting-switching apparatus of the present disclosure mentioned above, the pusher is made of an insulating material.

Moreover, in an embodiment of the antenna connecting-switching apparatus of the present disclosure mentioned above, the pusher is an annular body.

Moreover, in an embodiment of the antenna connecting-switching apparatus of the present disclosure mentioned above, the first connection structure further includes a fixed part arranged in the housing and arranged between the housing and the center conductor.

Moreover, in an embodiment of the antenna connecting-switching apparatus of the present disclosure mentioned above, the electronic switch includes a first contact, a second contact, a third contact and a fourth contact. The first contact is electrically connected to the first elastic piece. The second contact is electrically connected to the second connection structure. The third contact is electrically connected to the wireless communication circuit. The fourth contact is electrically connected to the internal antenna.

Moreover, in an embodiment of the antenna connecting-switching apparatus of the present disclosure mentioned above, the second elastic piece is electrically connected to the housing. The voltage signal is a ground voltage.

The advantage of the present disclosure is to reduce the difficulty of manufacturing the antenna connecting-switching apparatus.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
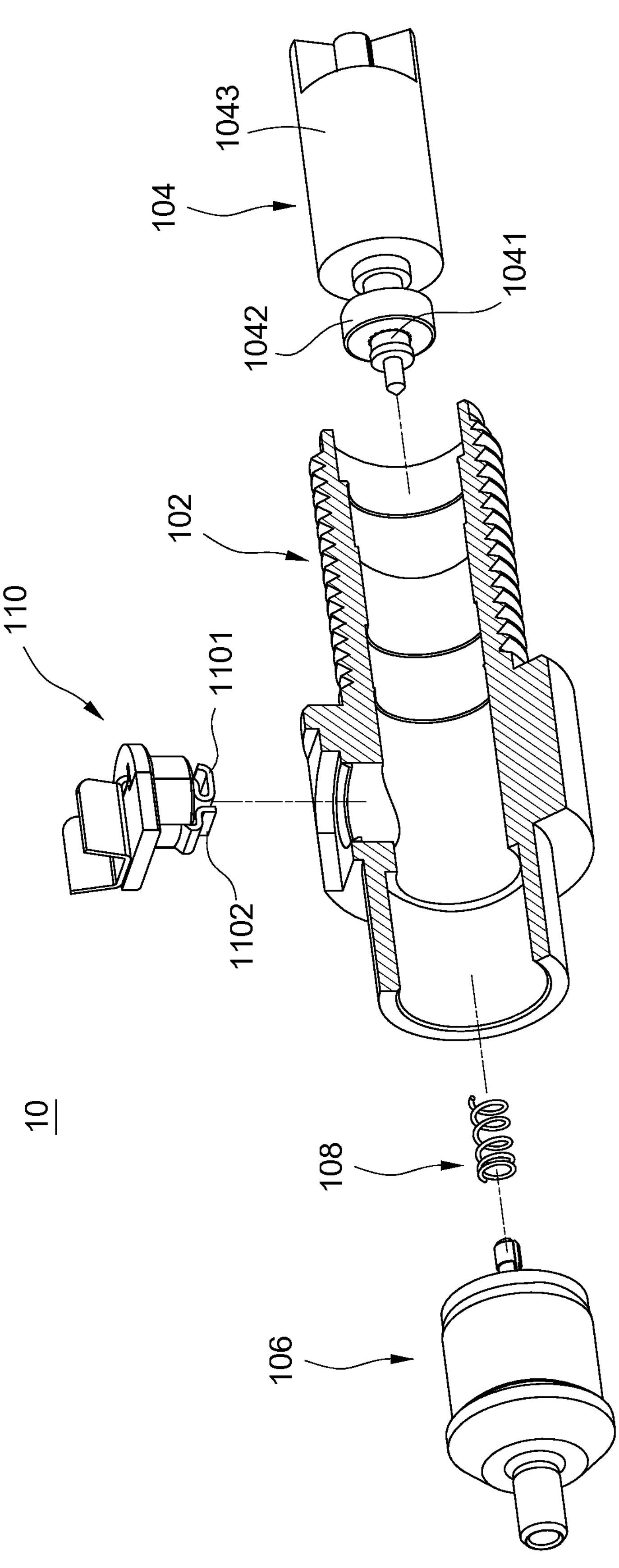
FIG. 1 shows an exploded view of the antenna connecting-switching apparatus of the present disclosure.
Figure 2:
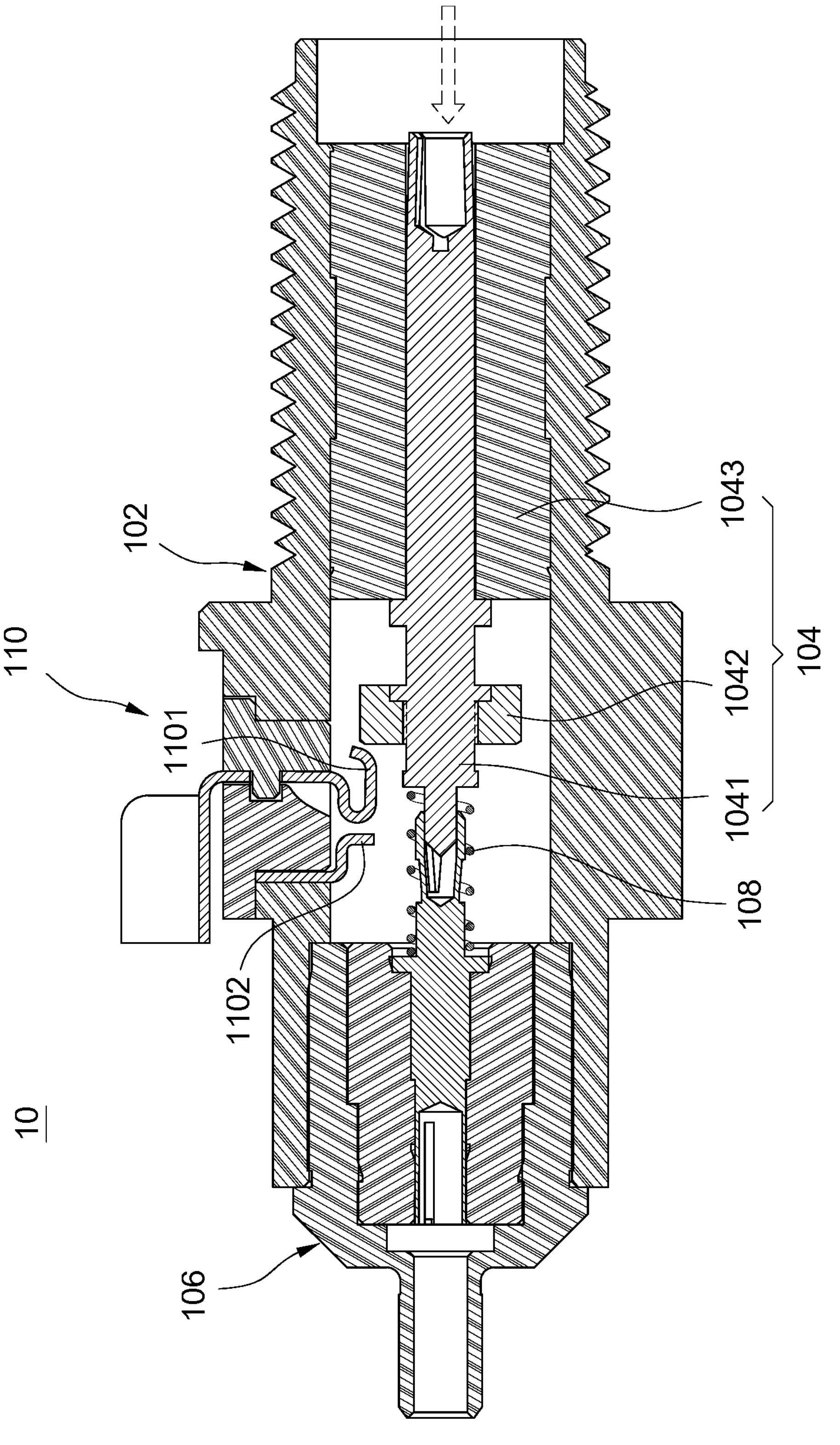
FIG. 2 shows a combined cross-sectional view of the antenna connecting-switching apparatus of the present disclosure, wherein the first elastic piece does not contact the second elastic piece.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows an exploded view of the antenna connecting-switching apparatus 10 of the present disclosure. FIG. 2 shows a combined cross-sectional view of the antenna connecting-switching apparatus 10 of the present disclosure, wherein the first elastic piece 1101 does not contact the second elastic piece 1102. Please refer to FIG. 1 and FIG. 2 at the same time. An antenna connecting-switching apparatus 10 of the present disclosure includes a housing 102, a first connection structure 104, a second connection structure 106, an elastic body 108 and an elastic piece structure 110. The elastic piece structure 110 includes a first elastic piece 1101 and a second elastic piece 1102. The first connection structure 104 includes a center conductor 1041, a pusher 1042 and a fixed part 1043.

The first connection structure 104 is arranged in the housing 102. The second connection structure 106 is arranged in the housing 102 and connected to the first connection structure 104. The elastic body 108 is arranged in the housing 102 and arranged between the first connection structure 104 and the second connection structure 106. The elastic body 108 and the housing 102 are electrically insulated, so that a potential of the housing 102 is not affected by the elastic body 108. The elastic piece structure 110 is connected to the housing 102.

The center conductor 1041 is arranged in the housing 102 and connected to the second connection structure 106. The pusher 1042 is arranged in the housing 102 and connected to the center conductor 1041. The fixed part 1043 is arranged in the housing 102 and arranged between the housing 102 and the center conductor 1041. The elastic body 108 is, for example but not limited to, a spring. The pusher 1042 is, for example but not limited to, an annular body. The pusher 1042 is, for example but not limited to, made of an insulating material.

Figure 3:
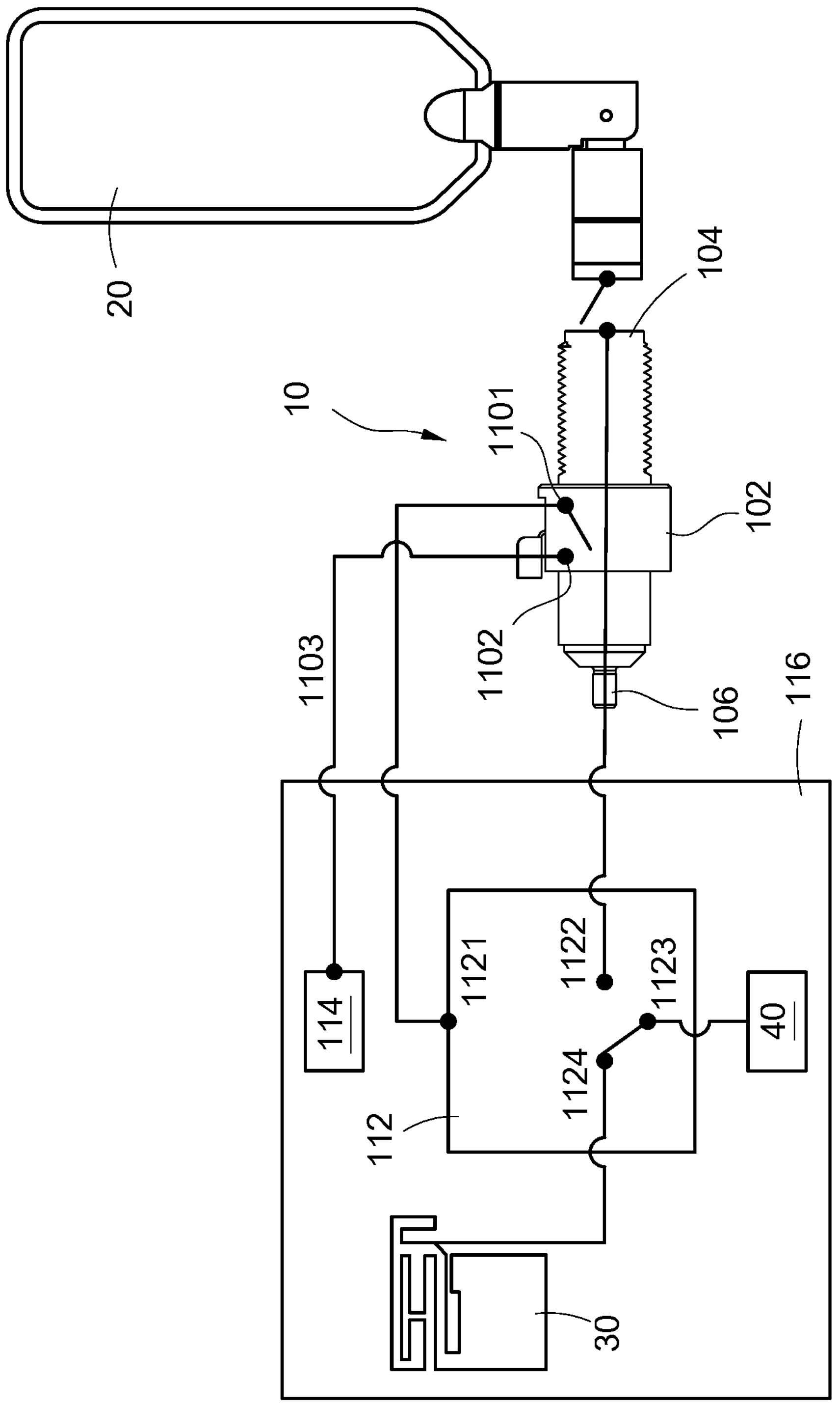
FIG. 3 shows a circuit block diagram of the first embodiment of the antenna connecting-switching apparatus of the present disclosure, wherein the first elastic piece does not contact the second elastic piece.

FIG. 3 shows a circuit block diagram of the first embodiment of the antenna connecting-switching apparatus 10 of the present disclosure, wherein the first elastic piece 1101 does not contact the second elastic piece 1102. The antenna connecting-switching apparatus 10 is applied to an external antenna 20, an internal antenna 30 and a wireless communication circuit 40. The antenna connecting-switching apparatus 10 further includes an electronic switch 112 and a voltage supply 114. The electronic switch 112 includes a first contact 1121, a second contact 1122, a third contact 1123 and a fourth contact 1124. The electronic switch 112 has a 50 ohms impedance match. Moreover, the antenna connecting-switching apparatus 10 further includes a mainboard 116. The internal antenna 30, the wireless communication circuit 40, the electronic switch 112 and the voltage supply 114 are arranged on the mainboard 116.

The electronic switch 112 is electrically connected to the first elastic piece 1101, the second connection structure 106, the wireless communication circuit 40 and the internal antenna 30. The voltage supply 114 is electrically connected to the second elastic piece 1102. The first contact 1121 is electrically connected to the first elastic piece 1101. The second contact 1122 is electrically connected to the second connection structure 106. The third contact 1123 is electrically connected to the wireless communication circuit 40. The fourth contact 1124 is electrically connected to the internal antenna 30. The second elastic piece 1102 has a voltage signal 1103.

Figure 4:
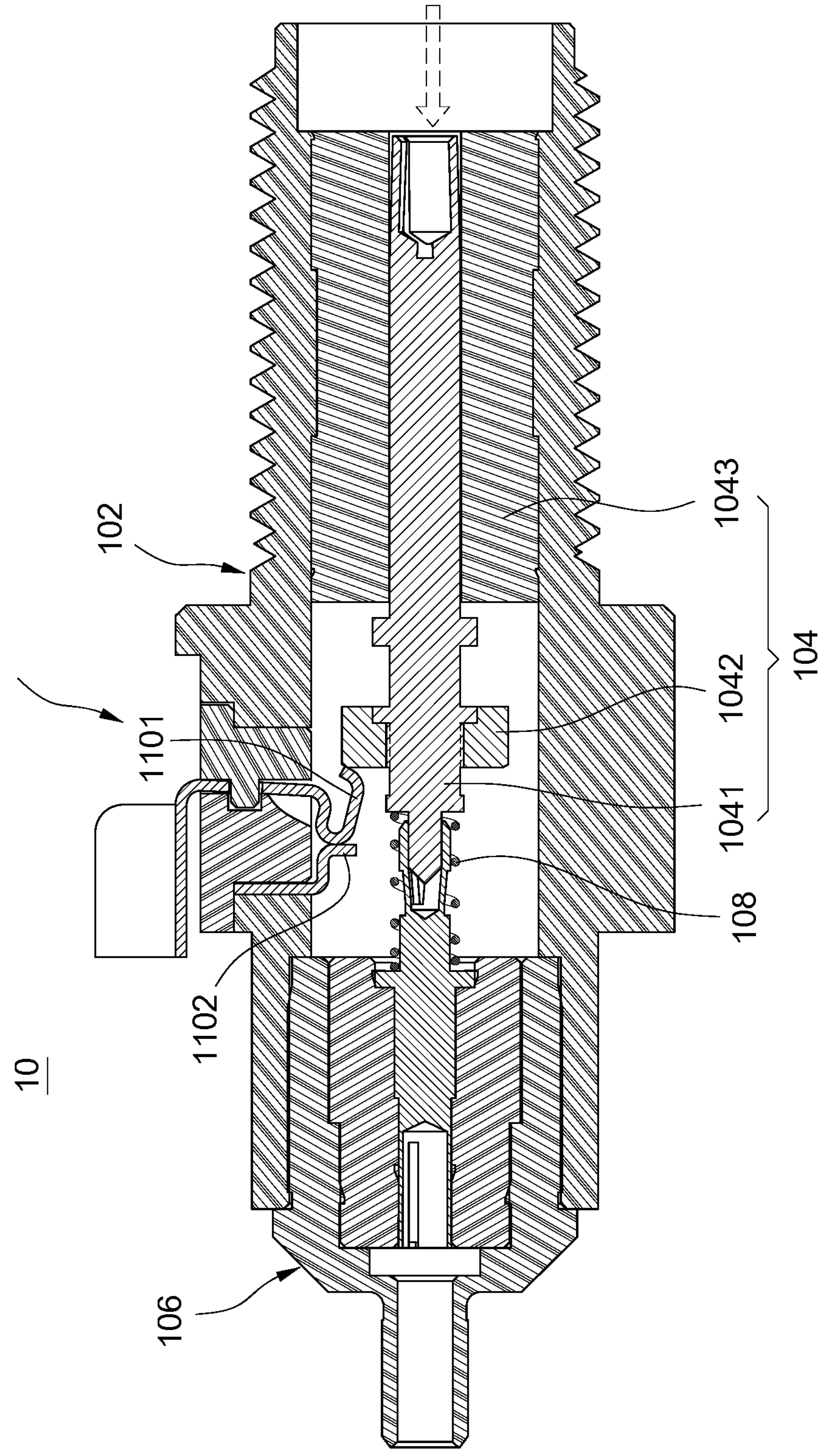
FIG. 4 shows a combined cross-sectional view of the antenna connecting-switching apparatus of the present disclosure, wherein the first elastic piece contacts the second elastic piece.
Figure 5:
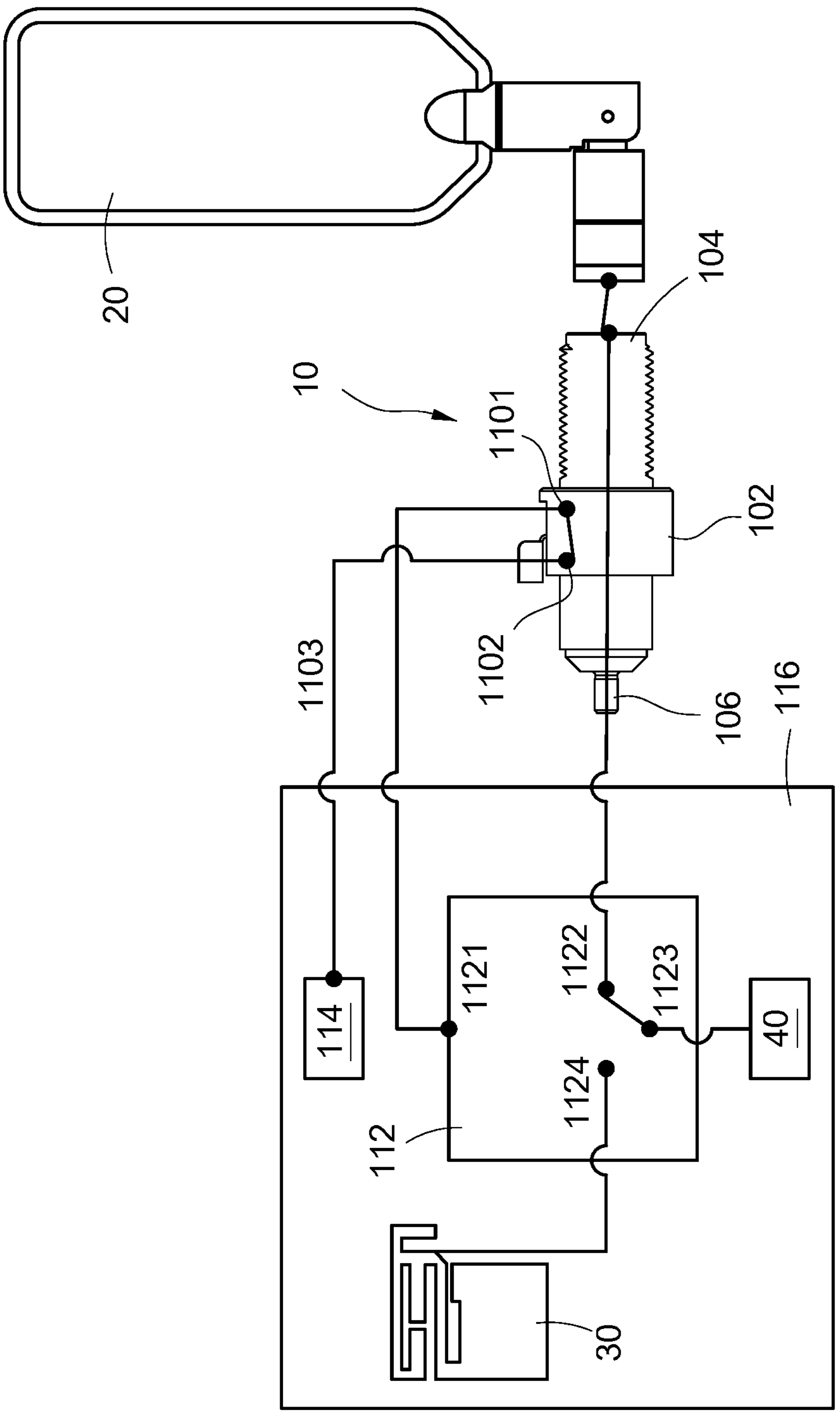
FIG. 5 shows a circuit block diagram of the first embodiment of the antenna connecting-switching apparatus of the present disclosure, wherein the first elastic piece contacts the second elastic piece.

FIG. 4 shows a combined cross-sectional view of the antenna connecting-switching apparatus of the present disclosure, wherein the first elastic piece 1101 contacts the second elastic piece 1102. FIG. 5 shows a circuit block diagram of the first embodiment of the antenna connecting-switching apparatus 10 of the present disclosure, wherein the first elastic piece 1101 contacts the second elastic piece 1102.

Please refer to FIG. 4 and FIG. 5 at the same time. When the external antenna 20 is connected to the first connection structure 104, the first connection structure 104 is configured to compress the elastic body 108 and push the first elastic piece 1101, the first elastic piece 1101 is configured to contact the second elastic piece 1102, and the electronic switch 112 is configured to be switched so that the wireless communication circuit 40 is electrically connected to the external antenna 20.

In other words, when the external antenna 20 is connected to the first connection structure 104, the first connection structure 104 is configured to compress the elastic body 108 and push the first elastic piece 1101, the first elastic piece 1101 is configured to contact the second elastic piece 1102, so that the second elastic piece 1102 is configured to transmit the voltage signal 1103 to the first elastic piece 1101, and the electronic switch 112 is configured to receive the voltage signal 1103 through the first elastic piece 1101, so that the electronic switch 112 is configured to be switched so that the wireless communication circuit 40 is electrically connected to the external antenna 20 through the electronic switch 112, the second connection structure 106 and the first connection structure 104.

In more detail, when the external antenna 20 is connected to the first connection structure 104, the external antenna 20 pushes the center conductor 1041 of the first connection structure 104, so that the center conductor 1041 is configured to compress the elastic body 108 and drive the pusher 1042 to push the first elastic piece 1101, the first elastic piece 1101 is configured to contact the second elastic piece 1102, so that the second elastic piece 1102 is configured to transmit the voltage signal 1103 to the first elastic piece 1101, and the electronic switch 112 is configured to receive the voltage signal 1103 through the first elastic piece 1101, so that the electronic switch 112 is configured to be switched so that the wireless communication circuit 40 is electrically connected to the external antenna 20 through the electronic switch 112, the second connection structure 106 and the first connection structure 104.

Please refer to FIG. 2 and FIG. 3 at the same time. When the external antenna 20 stops being connected to the first connection structure 104, the first connection structure 104 is configured to stop compressing the elastic body 108, so that the elastic body 108 is configured to rebound to push the first connection structure 104, so that the first connection structure 104 is configured to stop pushing the first elastic piece 1101, the first elastic piece 1101 is configured to stop contacting the second elastic piece 1102, and the electronic switch 112 is configured to be switched so that the wireless communication circuit 40 is electrically connected to the internal antenna 30.

In other words, when the external antenna 20 stops being connected to the first connection structure 104, the first connection structure 104 is configured to stop compressing the elastic body 108, so that the elastic body 108 is configured to rebound to push the first connection structure 104, so that the first connection structure 104 is configured to stop pushing the first elastic piece 1101, the first elastic piece 1101 is configured to stop contacting the second elastic piece 1102, so that the second elastic piece 1102 is configured to stop transmitting the voltage signal 1103 to the first elastic piece 1101, and the electronic switch 112 is configured to stop receiving the voltage signal 1103, so that the electronic switch 112 is configured to be switched so that the wireless communication circuit 40 is electrically connected to the internal antenna 30 through the electronic switch 112.

In more detail, when the external antenna 20 stops being connected to the first connection structure 104, the external antenna 20 is removed from the center conductor 1041, the center conductor 1041 of the first connection structure 104 is configured to stop compressing the elastic body 108, so that the elastic body 108 is configured to rebound to push the center conductor 1041 of the first connection structure 104 to drive the pusher 1042, so that the pusher 1042 of the first connection structure 104 is configured to stop pushing the first elastic piece 1101, the first elastic piece 1101 is configured to stop contacting the second elastic piece 1102, so that the second elastic piece 1102 is configured to stop transmitting the voltage signal 1103 to the first elastic piece 1101, and the electronic switch 112 is configured to stop receiving the voltage signal 1103, so that the electronic switch 112 is configured to be switched so that the wireless communication circuit 40 is electrically connected to the internal antenna 30 through the electronic switch 112.

Moreover, the electronic switch 112 receiving the voltage signal 1103 to switch the electronic switch 112 to electrically connect the wireless communication circuit 40 to the external antenna 20, and the electronic switch 112 stopping receiving the voltage signal 1103 to switch the electronic switch 112 to electrically connect the wireless communication circuit 40 to the internal antenna 30, both belong to the inherent technology of a general electronic switch; many electronic switches on the market can achieve the above switching, so the details are not repeated here.

Figure 6:
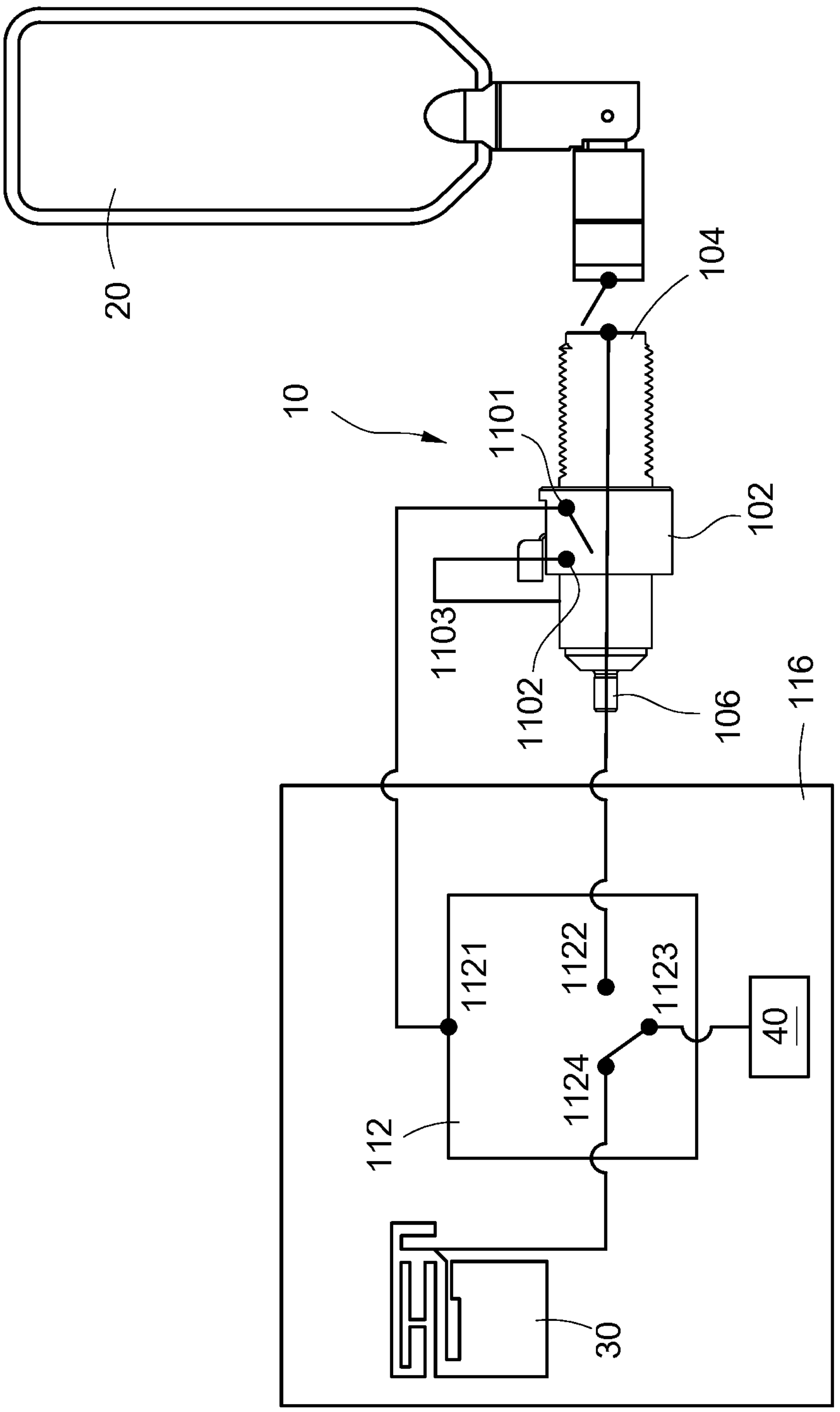
FIG. 6 shows a circuit block diagram of the second embodiment of the antenna connecting-switching apparatus of the present disclosure, wherein the first elastic piece does not contact the second elastic piece.
Figure 7:
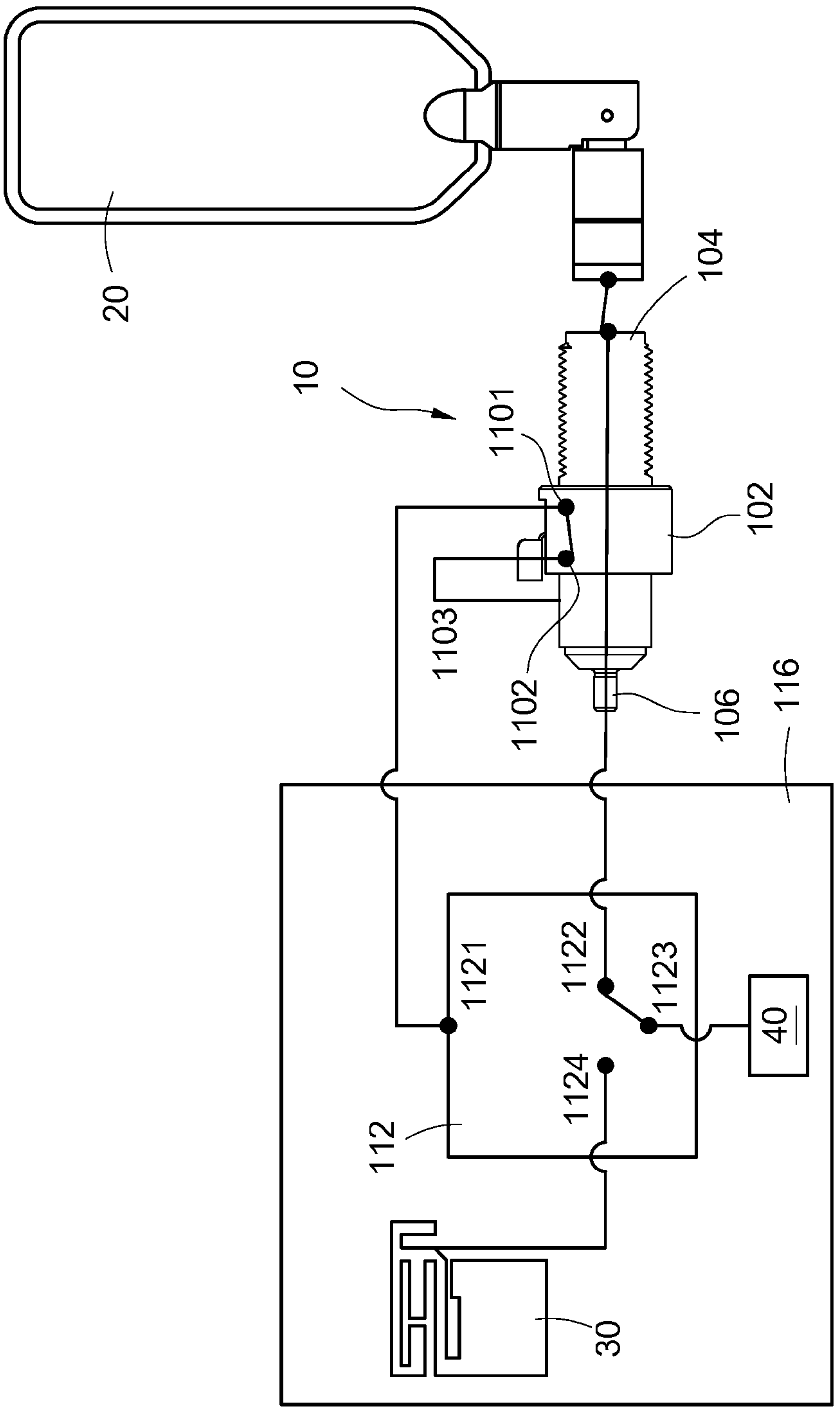
FIG. 7 shows a circuit block diagram of the second embodiment of the antenna connecting-switching apparatus of the present disclosure, wherein the first elastic piece contacts the second elastic piece.

In the first embodiment of FIG. 3 and FIG. 5 of the present disclosure, the voltage supply 114 is configured to generate and supply the voltage signal 1103 to the second elastic piece 1102; the voltage signal 1103 is a voltage greater than zero, but the present disclosure is not limited by it. FIG. 6 shows a circuit block diagram of the second embodiment of the antenna connecting-switching apparatus 10 of the present disclosure, wherein the first elastic piece 1101 does not contact the second elastic piece 1102. FIG. 7 shows a circuit block diagram of the second embodiment of the antenna connecting-switching apparatus 10 of the present disclosure, wherein the first elastic piece 1101 contacts the second elastic piece 1102. In the second embodiment of FIG. 6 and FIG. 7 of the present disclosure, the antenna connecting-switching apparatus 10 does not include the voltage supply 114; the second elastic piece 1102 is electrically connected to the housing 102, so that the voltage signal 1103 is a ground voltage (namely, zero voltage/volt).

Similarly, the electronic switch 112 receiving the ground voltage to switch the electronic switch 112 to electrically connect the wireless communication circuit 40 to the external antenna 20, and the electronic switch 112 stopping receiving the ground voltage to switch the electronic switch 112 to electrically connect the wireless communication circuit 40 to the internal antenna 30, both belong to the inherent technology of a general electronic switch; many electronic switches on the market can achieve the above switching, so the details are not repeated here.

Figure 8:
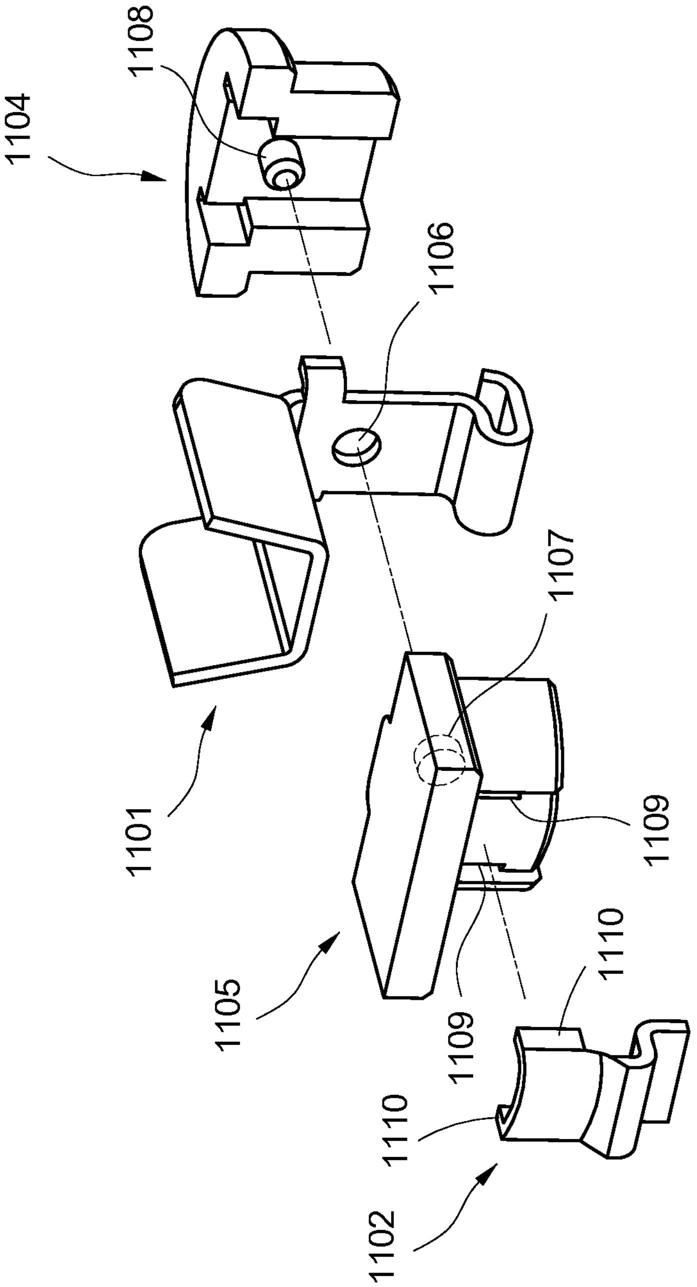
FIG. 8 shows an exploded view of the elastic piece structure of the present disclosure.

Moreover, FIG. 8 shows an exploded view of the elastic piece structure 110 of the present disclosure. The elastic piece structure 110 further includes a first fixing part 1104 and a second fixing part 1105. The first elastic piece 1101 defines a through hole 1106. The second fixing part 1105 defines a fixing hole 1107 and a plurality of embedded holes 1109. The first fixing part 1104 includes a fixing bump 1108. The second elastic piece 1102 includes a plurality of embedding bumps 1110. The fixing bump 1108 is through the through hole 1106 into the fixing hole 1107, so that the first elastic piece 1101 is sandwiched between the first fixing part 1104 and the second fixing part 1105. The second elastic piece 1102 is embedded into the embedded holes 1109 through the embedding bumps 1110 to be combined with the second fixing part 1105.

The advantage of the present disclosure is to reduce the difficulty of manufacturing the antenna connecting-switching apparatus.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. An antenna connecting-switching apparatus applied to an external antenna, an internal antenna and a wireless communication circuit, the antenna connecting-switching apparatus comprising:
- a housing;
- a first connection structure arranged in the housing;
- a second connection structure arranged in the housing and connected to the first connection structure;
- an elastic body arranged in the housing and arranged between the first connection structure and the second connection structure, the elastic body and the housing being electrically insulated;
- an elastic piece structure connected to the housing and comprising a first elastic piece and a second elastic piece, the second elastic piece having a voltage signal; and
- an electronic switch electrically connected to the first elastic piece, the second connection structure, the wireless communication circuit and the internal antenna,
- wherein when the external antenna is connected to the first connection structure, the first connection structure is configured to compress the elastic body and push the first elastic piece, the first elastic piece is configured to contact the second elastic piece, and the electronic switch is configured to be switched so that the wireless communication circuit is electrically connected to the external antenna;
- wherein when the external antenna stops being connected to the first connection structure, the first connection structure is configured to stop compressing the elastic body, so that the elastic body is configured to rebound to push the first connection structure, so that the first connection structure is configured to stop pushing the first elastic piece, the first elastic piece is configured to stop contacting the second elastic piece, and the electronic switch is configured to be switched so that the wireless communication circuit is electrically connected to the internal antenna.

2. The antenna connecting-switching apparatus of claim 1, wherein the elastic body is a spring.

3. The antenna connecting-switching apparatus of claim 2, further comprising:
- a voltage supply electrically connected to the second elastic piece,
- wherein the voltage supply is configured to generate and supply the voltage signal to the second elastic piece; the voltage signal is a voltage greater than zero.

4. The antenna connecting-switching apparatus of claim 3, wherein the first connection structure comprises:
- a center conductor arranged in the housing and connected to the second connection structure.

5. The antenna connecting-switching apparatus of claim 4, wherein the first connection structure further comprises:
- a pusher arranged in the housing and connected to the center conductor.

6. The antenna connecting-switching apparatus of claim 5, wherein the pusher is made of an insulating material.

7. The antenna connecting-switching apparatus of claim 6, wherein the pusher is an annular body.

8. The antenna connecting-switching apparatus of claim 7, wherein the first connection structure further comprises:
- a fixed part arranged in the housing and arranged between the housing and the center conductor.

9. The antenna connecting-switching apparatus of claim 8, wherein the electronic switch comprises a first contact, a second contact, a third contact and a fourth contact; the first contact is electrically connected to the first elastic piece; the second contact is electrically connected to the second connection structure; the third contact is electrically connected to the wireless communication circuit; the fourth contact is electrically connected to the internal antenna.

10. The antenna connecting-switching apparatus of claim 2, wherein the second elastic piece is electrically connected to the housing; the voltage signal is a ground voltage.

* * * * *